United States Patent [19]

Levy et al.

[11] Patent Number: 5,479,829

[45] Date of Patent: Jan. 2, 1996

[54] METHOD FOR QUANTITATIVE INSPECTION OF COLD-EXPANDED FASTENER HOLES

[75] Inventors: Alan Levy, Stony Brook; James R. Kennedy, Huntington; John M. Papazian, Great Neck, all of N.Y.

[73] Assignee: Northrop Grumman Corporation, Los Angeles, Calif.

[21] Appl. No.: 357,741

[22] Filed: Dec. 16, 1994

[51] Int. Cl.$^6$ ........................................ G01M 5/00
[52] U.S. Cl. ................ 73/823; 73/802; 29/407; 29/705
[58] Field of Search ................ 73/802/823; 29/407, 29/705

[56] References Cited

U.S. PATENT DOCUMENTS

| | | | |
|---|---|---|---|
| 4,557,033 | 12/1985 | Champoux | 29/525 |
| 5,154,780 | 10/1992 | Premkumar. | |
| 5,265,456 | 11/1993 | Kennedy et al. | 72/342.7 |
| 5,297,435 | 3/1994 | Papazian | 73/597 |
| 5,305,627 | 4/1994 | Quincey et al. | 72/370 |

*Primary Examiner*—Raevis
*Attorney, Agent, or Firm*—Terry J. Anderson; Karl J. Hoch, Jr.

[57] ABSTRACT

A method for inspecting a cold expanded fastener hole in a structural part to confirm that the hole has been expanded by a desired amount involves determining the degree to which the hole has been expanded as a function of the out-of-plane deformation in material surrounding an entrance or exit of the hole formed as a result of the cold expansion process. Out-of-plane deformation at either of the entrance or exit is compared to a model constructed from an array of experimentally or analytically determined out-of-plane deformation profiles for a hole with the same, or substantially the same, dimensions subjected to varying degrees of cold expansion. The degree of expansion of the hole is derived based on this comparison.

10 Claims, 5 Drawing Sheets

5,479,829

METHOD FOR QUANTITATIVE INSPECTION OF COLD-EXPANDED FASTENER HOLES

BACKGROUND OF THE INVENTION

1. Field of the Invention.

This invention generally relates to enhancing the fatigue life of the material around a hole in a structural part by subjecting the hole to a cold expansion process, and more particularly to a method for inspecting a cold expanded (CX) fastener hole to confirm that the hole has been expanded by a desired amount.

2. Description of the Related Art.

Fastener holes drilled into a structural part, which, for example, may be a metal plate of a type used to construct the fuselage or control surfaces of an aircraft, may fail over time from fatigue cracking. In order to prevent this from happening, a process known as cold expansion is often used to condition the material around the holes so that the material will develop a resistance to fatigue stress.

The cold expansion process is usually performed by pulling an oversized mandrel through a fastener hole in accordance with a predetermined schedule. The mandrel compresses the material around the hole beyond the elastic-plastic boundary until plastic deformation occurs and the hole diameter becomes permanently increased by a desired amount. It is the plastic deformation that occurs in the material around the hole that increases its resistance to fatigue cracking.

The cold expansion process, however, has been known to fail if improperly executed. The CX holes in a structural part therefore should be inspected before the part is installed in order to confirm that the holes have been expanded by an amount sufficient to achieve a desired level of fatigue resistance.

It is well known that the plastic deformation that occurs during cold expansion causes a residual compressive circumferential stress distribution to form in the metal surrounding the CX hole. It is also well known that the degree of expansion of a CX hole is proportional to, and thus can be determined by measuring, this residual stress distribution.

Known methods for measuring the residual stress distribution around a CX hole require that a series of diameter measurements be taken at discrete points throughout the length of the hole before and after the expansion process. A statistical analysis is then performed, which involves taking the average difference between the pre- and post-expansion diameter measurements. A particular residual stress distribution around the CX hole is then assumed to exist based on this statistical average.

Residual stress distribution measurements computed in this fashion have proven to be inaccurate for at least two reasons. First, the gauges used to take the hole diameter measurements are of limited accuracy. Any errors associated with these hole diameter readings will translate as errors in the stress distribution measurement.

Second, the statistical analysis used is based on a number of faulty assumptions which further distort the stress distribution measurement. It is assumed, for example, that the diameter of a CX hole is uniform throughout its length, but this is clearly not so. In a vast majority of cases, the mandrel used to perform the cold expansion produces a hole with a non-uniform diameter. A stress distribution measurement based on the assumption that the hole was of uniform diameter therefore will be inaccurate in cases where the hole in fact has a non-uniform diameter.

Prior art methods for measuring the expansion of a CX hole are undesirable for two other reasons. One, they are slow to implement primarily because of the care which must be taken in making the required hole diameter measurements. And two, prior art methods for measuring the degree of expansion of a CX hole can only be employed before the structural part is installed.

Based on the foregoing discussion, it is clear that a need exists for a method of measuring the degree of expansion of a CX hole which is free from the drawbacks associated with prior art cold expansion measurement techniques, and preferably one which is faster, more accurate, and simpler to implement compared with its prior art counterparts.

SUMMARY OF THE INVENTION

It is a first objective of the present invention to provide a method for measuring the expansion of a CX hole which is more accurate than any of the methods known in the prior art.

It is a second objective of the present invention to achieve the first objective by measuring the residual stress distribution around a CX hole not by relying on imprecise diameter measurements or faulty assumptions, as prior art methods do, but as a function of out-of-plane deformation, e.g., displacements or any other measurement that relates to out-of-plane displacement, such as strains, that have formed around the hole as a result of the cold expansion process.

It is third objective of the present invention to provide a method for measuring the expansion of a CX hole which is simpler and faster to implement than any of the methods known in the prior art.

It is a fourth objective of the prior art to achieve the third objective by reducing the number of measurements which need to be taken in order to measure the expansion of a CX hole, the reduction being achieved by performing a quantitative analysis which requires taking a single three-dimensional measurement at the entrance and/or exit of a CX hole, instead of performing, as prior art methods do, a qualitative analysis which requires that a series of diameter measurements be taken at discrete locations throughout the entire length of the hole both before and after the coldworking process.

It is a fifth objective of the present invention to provide a method for measuring the expansion of a CX hole in a structural part after the part has been installed.

The foregoing and other objectives of the present invention are achieved by providing a three-step method which determines the degree of expansion of a CX hole by measuring the out-of-plane deformation that has formed around the hole as a result of the cold expansion process. The first step involves measuring the out-of-plane deformation formed around either the entrance or exit of the CX hole. The second step involves comparing the entrance and exit out-of-plane deformation measurements to a model constructed from an array of experimentally or analytically determined out-of-plane deformation profiles obtained for a CX hole having the same, or substantially the same, dimensions at varying degrees of cold expansion. The third step involves determining the degree of expansion of the hole based on the closest match between the deformation measurement and the profiles in the model. The measurement so obtained is highly accurate because it is not encumbered with the cumulative errors associated with hole diameter readings and faulty assumptions which prior art methods rely on to compute cold expansion.

DESCRIPTION OF THE PREFERRED EMBODIMENTS

The present invention is a method for measuring the degree of expansion of a CX fastener hole in a structural part, which may be a metal plate of a type used to fabricate the fuselage and control surfaces of an aircraft but which is in no way limited to such a plate.

The CX fastener hole may be formed by a conventional coldworking process, such as pulling an oversized mandrel through the hole using a puller tool such as the one disclosed in U.S. Pat. No. 5,305,627. The effects of coldworking a hole in this manner are illustrated in FIGS. 1 and 2.

Figure 1:
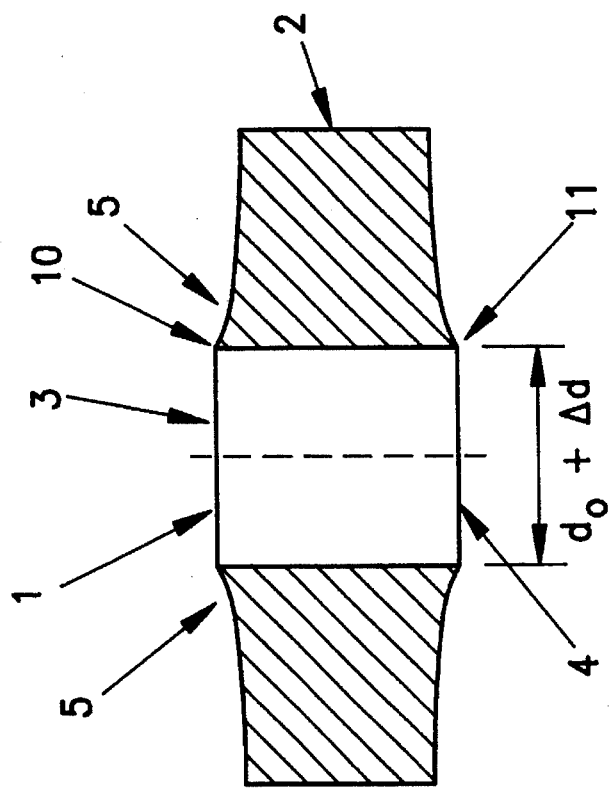
FIG. 1 is a cross-sectional diagram of a hole in a metal plate prior to being subjected to a cold expansion process.
Figure 2:
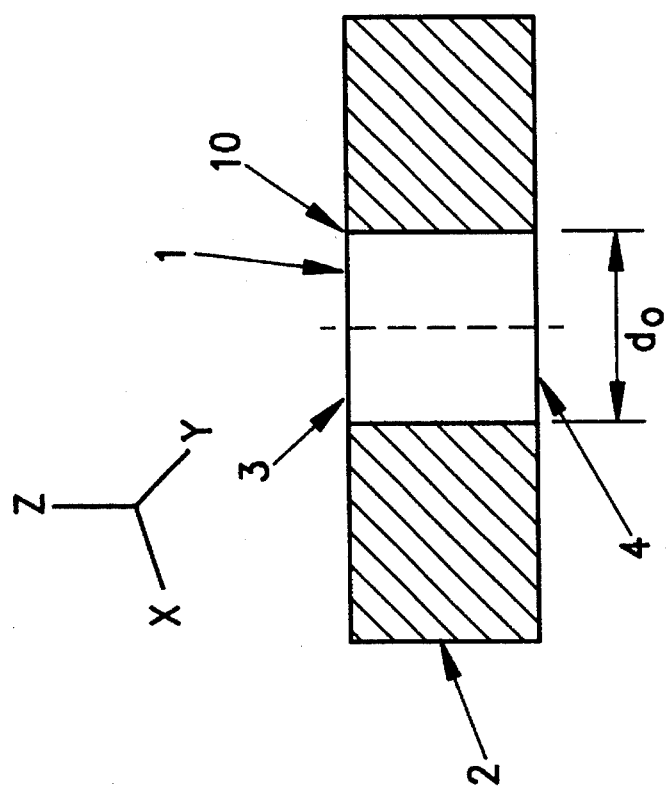
FIG. 2 is a cross-sectional diagram of a hole in a metal plate after being subjected to a cold expansion process.

Referring specifically to FIG. 1, the diameter of a hole 1 formed in a metal plate 2 before expansion is shown as $d_o$. Forcing a mandrel (not shown) through the hole causes the material around the hole to expand until plastic deformation occurs and the diameter of the hole is permanently increased to $d_o+\Delta d$, as shown in FIG. 2. The plastic deformation causes a residual compressive circumferential stress distribution to form in the metal surrounding the hole.

The degree of expansion the CX hole has experienced is related to the residual stress distribution around the hole, and this distribution, in turn, is related to the amount of plastic deformation that has taken place around an entrance 3 and an exit 4 of the CX hole. The plastic deformation of interest to the present invention, however, is only that deformation which forms in a direction transverse to the planes in which the hole entrance and exit reside, i.e., in the Z-direction if the hole entrance and exit reside in XY planes. One representation of this out-of-plane deformation, known as out-of-plane displacement, is shown in FIG. 2 as substantially parabolic portions 5 surrounding the entrance and exit of the hole.

A preferred embodiment of the method of the present invention is accomplished in three steps. The first step involves taking a three-dimensional measurement of the out-of-plane displacement around the entrance of the CX hole relative to an edge 10 defining the hole entrance. This measurement can be taken mechanically using diamond-stylus profilometry, optically by laser-based profilometry, holographic interferometry, or other method that can image typographic features, or electro-mechanically by strain gauges.

Alternatively, a three-dimensional measurement of the out-of-plane displacement around the exit of the CX hole may be taken, using any one of the aforementioned techniques, relative to an edge 11 defining the hole exit.

The three-dimensional out-of-plane displacement measurement taken in the first step advantageously provides an indication of the uniformity and consistency of the stress distribution around the CX hole. For example, a CX hole having a perfectly uniform stress distribution will produce a symmetric pattern of out-of-plane displacement around the hole entrance or exit. In contrast, a CX hole having a non-uniform stress distribution will produce an asymmetric pattern of out-of-plane displacement around its entrance or exit. Either way, the present method accurately measures the distribution to provide a true measurement of the degree of cold expansion which the hole has undergone. (This invention, and many of the technical statements enclosed herein, are based, in part, on three dimensional analysis that establishes the unique correlation between out-of-plane measurements and the amount of cold working, for a given geometry and material.)

It is also important to emphasize at this time that the out-of-plane measurements taken are not based on plane-stress assumptions. Plane stress assumptions lead to the conclusion that residual out-of-plane deformation does not occur in an elastic region and must end at the elastic-plastic boundary. In fact, the three-dimensional analysis performed in accordance with the method of the present invention. The out-of-plane displacement not only does not end at the elastic-plastic boundary but extends into the plastic region. Furthermore, the extent to which the out-of-plane deformation extends beyond the elastic-plastic boundary increases as the plate thickness-to-hole diameter ratio increases.

The second step involves comparing the out-of-plane displacement measurement taken in the first step to a model, which may be constructed from an array of experimentally or analytically determined out-of-plane displacement profiles for a like hole subjected to varying degrees of cold expansion. (The term "like hole" means a hole having the same, or substantially the same, parameters, e.g., hole size, diameter, and geometry, as that treated, and formed in a plate made from the same, or substantially the same, material thickness.)

The third and final step involves determining the degree to which the CX hole has been cold expanded based on the closest match between the out-of-plane displacement measurement and profiles in the model.

One purpose of the method of the present invention is to confirm whether or not a CX fastener hole has actually undergone the degree of cold expansion which it was supposed to have experienced. This purpose is an important one because if the hole has been underexpanded, its fatigue life could be significantly shortened, leading to premature failure. In such a case, the cold expansion and inspection processes must be repeated until the underworked hole is expanded by to the prescribed amount sufficient to insure against premature failure.

The method of the present invention was used to inspect CX fastener holes drilled in quarter-inch thick 7075-T651 aluminum alloy plate in two specific examples. In both, the holes were subjected to a 5% cold expansion process. A coefficient of friction between the mandrel and the hole wall of 0.08 was used in the three-dimensional analytical model.

Figure 3:
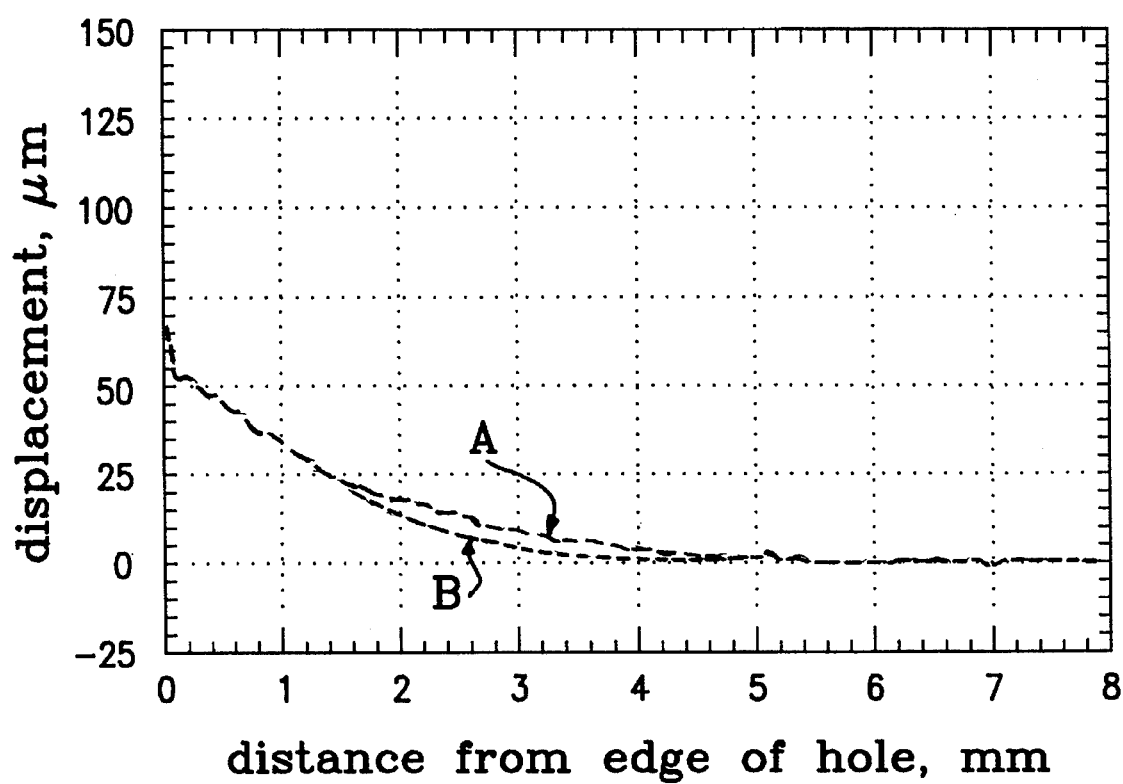
FIG. 3 is a graph comparing a curve plotting the out-of-plane displacement measured at the entrance of a CX hole in an aluminum alloy plate with a curve plotting the out-of-plane displacement for the entrance of a CX hole with the same, or substantially the same, dimensions generated by a model used in accordance with the method of the present invention.
Figure 4:
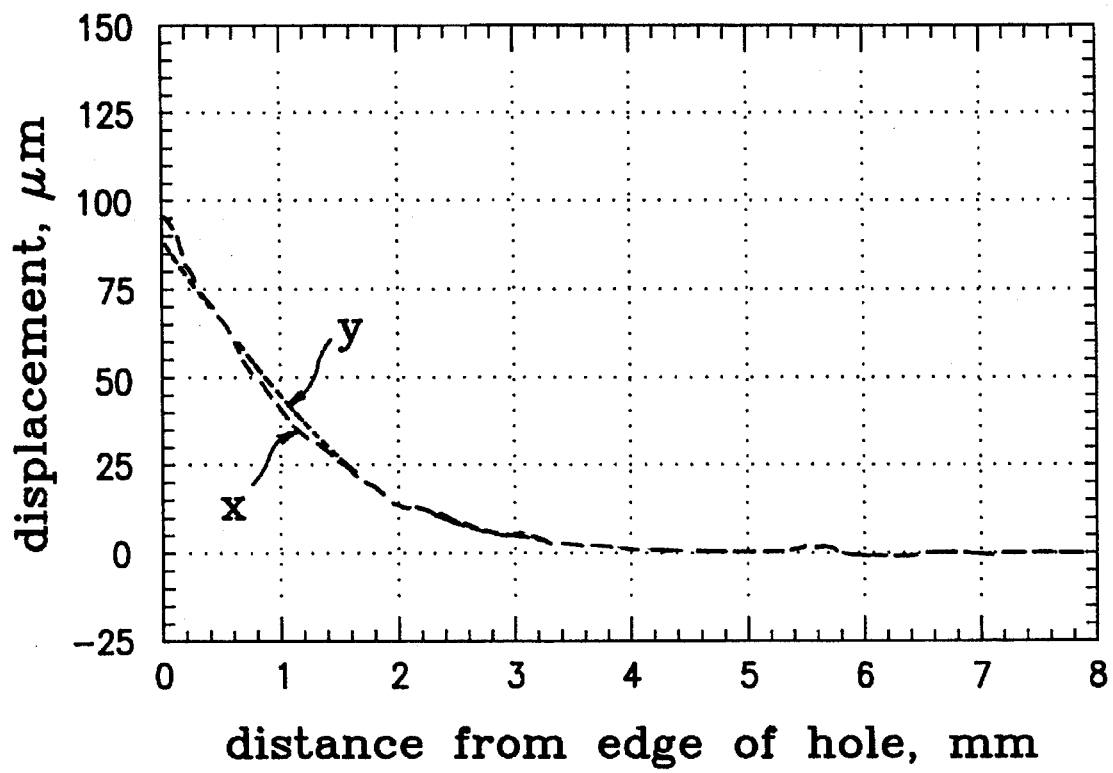
FIG. 4 is a graph comparing a curve plotting the out-of-plane displacement measured at the exit of a CX hole in an aluminum alloy plate with a curve plotting the out-of-plane displacement for the exit of a CX hole of the same, or substantially the same, dimensions generated by a model used in accordance with the method of the present invention.

In the first example, the hole was cold expanded by approximately 5%. FIGS. 3 and 4 show curves representing respectively the out-of-plane displacement obtained around the entrance and exit of the hole using known profilometry techniques. The curves lie on graphs which plot the amplitude of out-of-plane displacement in the Z-direction versus the distance of the displacement from the edge of the hole in the plane of the hole.

Referring specifically to FIG. 3, Curve A therein shows the out-of-plane displacement measured at the edge of the entrance of the hole (0 mm) to be approximately 60 microns. Curve A then tapers off parabolically until it reaches a 0 micron level of displacement at about 5 mm from the edge of the hole entrance. Curve B in FIG. 3 shows the out-of-plane displacement generated by the three-dimensional model for a hole entrance of the same size and geometry in a plate made from the same metal alloy and thickness. Except for a slight deviation in a range between 2 and 4 mm, the two curves are substantially identical.

Referring specifically to FIG. 4, Curve X therein shows the out-of-plane displacement measured at the edge of the exit of the hole (0 mm) to be approximately 95 microns. Curve X then tapers off parabolically until it reaches a level of 0 micron displacement at about 5 mm from the hole exit. Curve Y in FIG. 4 shows the out-of-plane displacement profile generated by the three-dimensional model for a hole exit of the same size and geometry in a plate made from the same metal alloy and thickness.

A comparison between these curves shows substantial identity. The close match between Curves A and B in FIG. 3 and Curves X and Y in FIG. 4 confirms that the hole was in fact subjected to approximately a 5% cold expansion.

Figure 5:
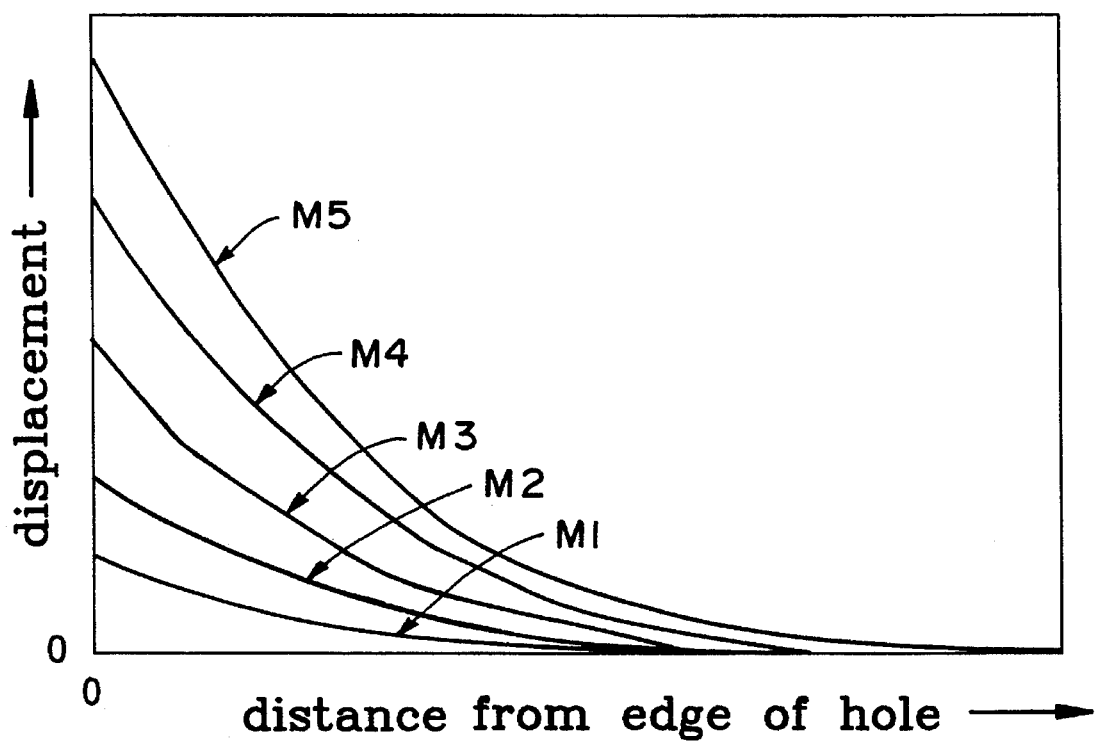
FIG. 5 is a graph setting forth the out-of-plane displacement profiles for a CX hole in an aluminum alloy plate subjected to varying degrees of cold expansion generated by a model used in accordance with the method of the present invention.
Figure 6:
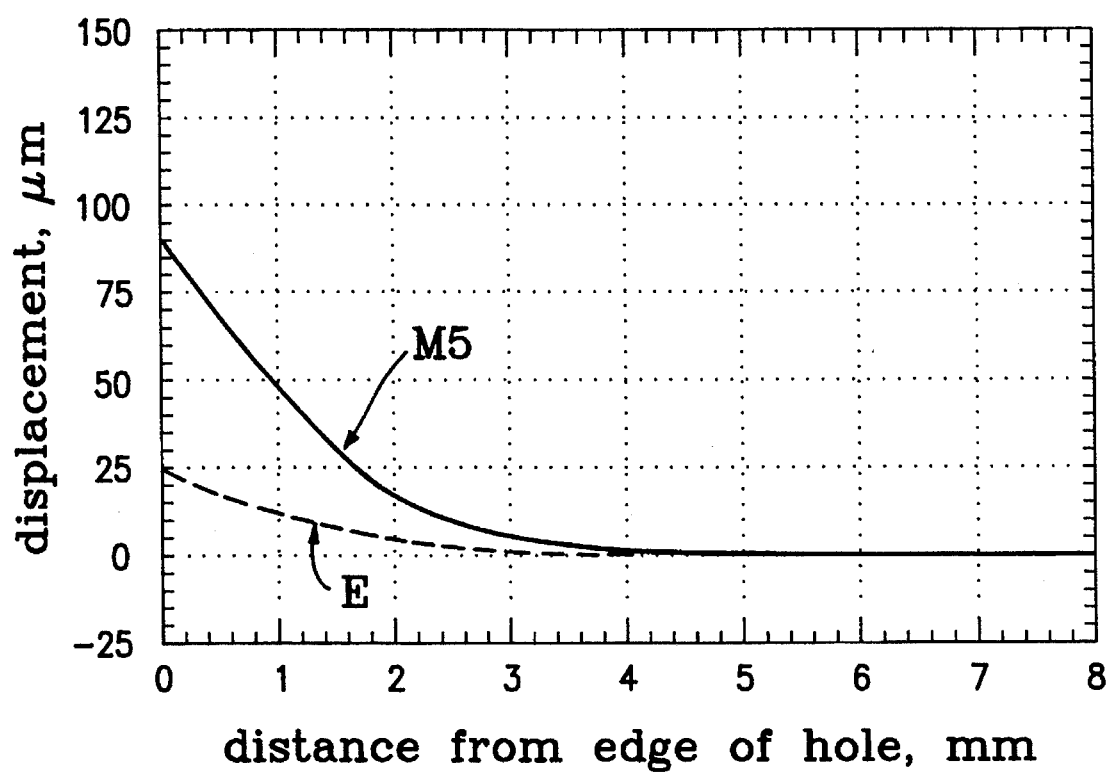
FIG. 6 is a graph comparing a curve plotting the out-of-plane displacement measured at the exit of a CX hole in an aluminum alloy plate with a curve plotting the out-of-plane displacement profile for the exit of a CX hole of the same, or substantially the same, dimensions generated by a model used in accordance with the method of the present invention.

In the second example, the hole was determined to have been cold expanded by an amount considerably less than 5%. FIG. 5 shows five curves labeled M1 through M5 representing out-of-plane displacement profiles generated by the three-dimensional model at a hole exit subjected to 1%, 2%, 3%, 4%, and 5% cold expansion, respectively. FIG. 6 is a graph comparing the 5% cold-expanded model-generated curve M5 shown in FIG. 5 with a curve labeled E plotting the out-of-plane displacement measured at the hole exit by conventional profilometry techniques. The obvious disparity between Curve M5 and Curve E in a range between 0 and 4 mm shows that the hole was subjected to a degree of expansion far less than 5%, and when compared with the other model curves in FIG. 5 shows that the actual expansion experienced by the hole is closer to 1 or 2%. The method of the present invention thus can advantageously be used to identify underworked CX fastener holes so that they may be re-worked prior to installation of the part in which they have been formed.

The present method for measuring the degree of expansion of a CX hole is more accurate than prior art methods for at least two reasons:

One, prior art cold expansion measurements are based on a series of two-dimensional diameter measurements taken by hole gauges that have built-in errors which distort the accuracy of the cold expansion reading. In contrast, the present method measures cold expansion based on out-of-plane displacement measurements which are free from the errors associated with hole gauges and other types of diameter measuring instruments.

Two, the statistical analysis used by the prior art to compute cold expansion is based on faulty assumptions, most notably that the mandrel used to perform cold expansion produces a hole with a diameter which is uniform throughout the length of the hole. It is further assumed that the state of non-uniform residual stress distribution around a CX hole can be accurately assessed from a series of hole diameter measurements taken at discrete points along the length of the hole before and after expansion.

These assumptions are without merit. Mandrels used to perform cold expansion in fact produce holes which often have a non-uniform diameter throughout their length. This non-uniform diameter, caused by shear loading due to friction between the mandrel and the hole wall, causes an asymmetrical residual stress distribution to form around the hole. Prior art methods cannot measure an asymmetrical stress distribution around a CX hole with sufficient accuracy because hole diameter measurements taken along the length of the hole are usually too far apart, and extrapolation between these points has proven to be an inadequate means for determining the stress distribution between these measurements.

The method of the present invention, in contrast, does not compute the expansion of a CX hole based on any faulty assumptions. Moreover, the present method can accurately measure an asymmetrical stress distribution around a CX hole by virtue of the out-of-plane displacement measurements that are taken at the entrance and exit of the hole. This will now be explained in greater detail.

The deformation that takes place during cold expansion occurs not only at the entrance and exit of the hole but throughout its entire length. Because this is so, the hole entrance and exit out-of-plane displacement measurements provide an indication of the deformation that occurs throughout the entire length of the hole, something which the prior art cannot determine from its discrete hole diameter measurements. The out-of-plane displacement measurements translate into a highly accurate measurement of the degree of cold expansion the hole has experienced.

The method of the present invention is not only more accurate but faster and simpler to perform than prior art methods. A cold expansion measurement derived using the present method is based on only one measurement, taken either at the hole entrance or exit. The prior art, in contrast, requires that a series of time-consuming diameter measurements be taken at various discrete points along the length of the hole, both before and after cold working.

The present method is also more versatile than methods used in the prior art. Measurements can be taken both before and after installation of the structural part under the present method, as well as during service, as a part of an evaluation or re-work sequence of the structural part.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. A method for measuring a degree of cold expansion of a cold expanded hole in a structural part, said hole having an opening located in at least one plane of the structural part and out-of-plane deformation in a material surrounding the opening formed as a result of cold expansion, said method comprising:

measuring the out-of-plane deformation in the material surrounding the opening relative to an edge defining the opening;

comparing the deformation measurement to a three-dimensional model constructed from an array of out-of-plane displacement profiles obtained for a hole which has substantially the same dimensions and which has been subjected to varying degrees of cold expansion; and determining the degree of cold expansion of the hole based on the results of this comparison.

2. The method recited in claim 1, wherein said opening forms an entrance to the hole.

3. The method recited in claim 1, wherein said opening forms an exit to the hole.

4. The method recited in claim 1, wherein the out-of-plane deformation is measured mechanically by diamond-stylus profilometry.

5. The method recited in claim 1, wherein the out-of-plane deformation is measured optically by laser-based profilometry.

6. The method recited in claim 1, wherein the out-of-plane deformation is measured electro-mechanically by strain gauges.

7. The method recited in claim 1, wherein the out-of-plane deformation is measured optically by holographic interferometry.

8. The method recited in claim 1, wherein cold expansion is measured after installation of the structural part.

9. The method recited in claim 1, wherein said hole is a cold expanded fastener hole located in a metal plate used in an aircraft structure.

10. The method recited in claim 9, wherein cold expansion is measured after installation of a fastener in the hole.

* * * * *

UNITED STATES PATENT AND TRADEMARK OFFICE
CERTIFICATE OF CORRECTION

PATENT NO. : 5,479,829
DATED : January 2, 1996
INVENTOR(S) : Levy, et al

It is certified that error appears in the above-indentified patent and that said Letters Patent is hereby corrected as shown below:

On the title page, item [75], Inventors "Alan Levy" should read --Alvin Levy--.

Signed and Sealed this

Sixteenth Day of April, 1996

*Attest:*

BRUCE LEHMAN

*Attesting Officer*  *Commissioner of Patents and Trademarks*